S. A. PEDLAR.
JOURNAL BOX LIFTER FOR CARS.
APPLICATION FILED SEPT. 6, 1910.

989,039.

Patented Apr. 11, 1911.

Witnesses.
A. H. Opsahl.
H. D. Kilgore.

Inventor
Sidney A. Pedlar
By his Attorneys
Williamson Merchant

UNITED STATES PATENT OFFICE.

SIDNEY A. PEDLAR, OF MINNEAPOLIS, MINNESOTA.

JOURNAL-BOX LIFTER FOR CARS.

989,039.  Specification of Letters Patent. Patented Apr. 11, 1911.

Application filed September 6, 1910. Serial No. 580,575.

*To all whom it may concern:*

Be it known that I, SIDNEY A. PEDLAR, a citizen of the United States, residing at Minneapolis, in the county of Hennepin and State of Minnesota, have invented certain new and useful Improvements in Journal-Box Lifters for Cars; and I do hereby declare the following to be a full, clear, and exact description of the invention, such as will enable others skilled in the art to which it appertains to make and use the same.

My invention has for its object to provide an extremely simple and efficient device applicable to a car truck and serving to lift the journal box in respect to an axle, so that the bearing brass may be readily removed from the journal box or applied in working position therein.

To the above ends the invention consists of the novel devices and combinations of devices hereinafter described and defined in the claim.

It is a well known fact that in trucks of railway cars and of engine tenders the so-called bearing brasses which are seated in the upper portions of the journal boxes and rest upon the axle journals, are normally held in working position by the weight of the load and may readily be removed from working position or placed in working position when the journal box is raised in respect to the axle journal. Various devices, such as jacks, have been provided for this purpose.

My improved box lifting device is in the nature of a flexible connection such as a chain, cable or rod and chain, and which is adapted to be placed in engagement with the projecting bottom portion of the journal box, or adjacent portion of the truck frame, and is provided with means whereby one end may be anchored to the truck wheel and the other end to the truck frame or other part of the truck structure, in such a manner that the journal box to which it is applied will be raised and the truck is given a slight movement.

The improved device, in its preferred form, is illustrated in the accompanying drawings wherein like characters indicate like parts throughout the several views.

Figure 1:
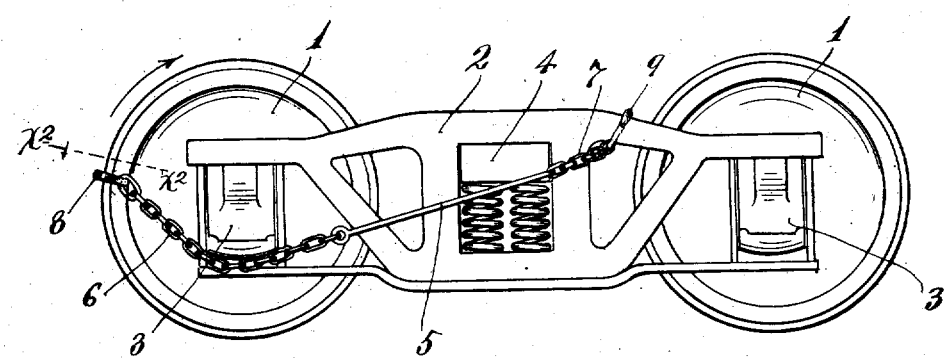
Figure 2:
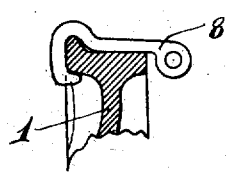
Figure 3:
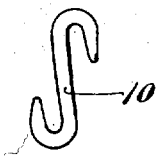

Figure 1 is a view in side elevation showing an ordinary car truck with my improved box lifting device applied thereto; Fig. 2 is a fragmentary section taken on the line $x^2 x^2$ of Fig. 1; and Fig. 3 is a detail view showing a double ended hook adapted for use in taking up the slack of the chain of the box lifting device.

Of the parts of the truck, the numeral 1 indicates the wheel, the numeral 2 the truck side frames, the numeral 3 the journal box and the numeral 4 the truck bolster, which parts may be assumed to be of standard and well known structure. As shown, the box lifting device comprises a rod 5, relatively long and short chain sections 6 and 7 attached thereto, and hooks 8 and 9 attached, respectively, to the ends of the said chains 6 and 7. The hook 8, (see particularly Fig. 2), is formed to loosely fit on the flanged rim of the wheel. Otherwise stated, the said hook 8 has a hook shaped end that will embrace the flange of the wheel rim and a hub portion lying in the plane of the said hooked end which will engage the outer edge of the wheel rim and thus tightly clamp and bite the wheel rim so that it will not slip thereon and be subjected to an angular or lateral pulling strain produced by rotation of the truck wheel in the direction of the arrow marked thereon in Fig. 1. The hook 9 is adapted to be applied to any suitable portion of the adjacent truck side frame 2 depending somewhat on the form of the latter, but the said hook in some instances, may be applied to the truck bolster 4 or to one of the journal boxes or even to one of the truck wheels. Preferably, however, it will be applied to the truck side frame, substantially as shown in the drawings. The S shaped or double ended hook 10, shown in Fig. 3 is adapted for use to take up slack of one or the other of the chains. This is sometimes found necessary, because the dimensions of the different truck side frame vary in distance between the points of attachment of the hooks 8 and 9.

When the device is applied, as shown in Fig. 1, and the truck is then slightly moved in a direction to rotate the truck wheel, as indicated by the arrow in Fig. 1, the box lifting connection will be tightened and drawn upward so as to lift the journal box to which it is applied, and at the same time it will draw downward on the truck wheel to which it is applied and thus positively prevent the truck wheel from being raised with the journal box. This latter feature is highly important because it has been found that in the use of various other journal box lifting devices, the wheel and axle will be lifted with the journal box. The device when applied as stated, also serves to lock the truck wheels. It is, of course, necessary to attach one end of the lifting device to one of the truck wheels in order to get the lifting movement, but the other end of the lifting device may, so far as the broad idea of my invention is concerned, be attached to any part of the car truck or car body. It might, for instance, be attached to the body bolster of the car or to the truss rods which are generally employed in the under structure of a car body. All these various different arrangements will be within the scope of the claim of the specification.
As already indicated, the lifting attachment or device may take various forms and may be applied to any and all trucks having journal boxes and journals of the general construction employed in railway equipment. The device has been used in actual practice and has been found highly efficient for the purposes had in view.

What I claim is:

A journal box lifting device comprising a rod, chains attached to the ends of said rod, and hooks applied to the ends of said chains, one of which hooks is constructed for engagement with the flanged rim of the wheel, the other of which is applicable to part of the truck frame, substantially as described.

In testimony whereof I affix my signature in presence of two witnesses.

SIDNEY A. PEDLAR.

Witnesses:
F. D. MERCHANT,
HARRY D. KILGORE.

Copies of this patent may be obtained for five cents each, by addressing the "Commissioner of Patents, Washington, D. C."